(12) United States Patent
Mitchell

(10) Patent No.: US 6,295,740 B1
(45) Date of Patent: Oct. 2, 2001

(54) POWER-MOVEMENT MEASURING TAPE

(76) Inventor: Bradley E. Mitchell, R.R. 2 Box 499, Pownal, VT (US) 05261

(*) Notice: Subject to any disclaimer, the term of this patent is extended or adjusted under 35 U.S.C. 154(b) by 0 days.

(21) Appl. No.: 09/524,425

(22) Filed: Mar. 11, 2000

(51) Int. Cl.[7] ................................................ G01B 3/10
(52) U.S. Cl. ............................................. 33/761; 33/755
(58) Field of Search ............................ 33/755, 759, 760, 33/761, 767; 242/250, 390, 390.8, 390.9, 916

(56) References Cited

U.S. PATENT DOCUMENTS

| | | | |
|---|---|---|---|
| 4,186,490 | 2/1980 | Quenot | 33/139 |
| 4,189,107 | 2/1980 | Quenot et al. | 242/84.8 |
| 4,449,302 | 5/1984 | Drechsler et al. | 33/138 |
| 4,489,494 | 12/1984 | Duda | 33/138 |
| 4,494,707 | 1/1985 | Niibori et al. | 242/67.2 |
| 4,551,847 | 11/1985 | Caldwell | 377/24 |
| 4,856,726 | 8/1989 | Kang | 242/84.8 |
| 4,903,912 | 2/1990 | Coughlin | 242/107.3 |
| 5,007,178 | 4/1991 | Dewire et al. | 33/767 |
| 5,044,089 | 9/1991 | Petkovic et al. | 33/755 |
| 5,104,056 | * 4/1992 | Jannotta et al. | 33/761 |
| 5,245,761 | 9/1993 | Waldherr | 33/767 |
| 5,294,066 | 3/1994 | LaCour | 242/54 |
| 5,386,643 | 2/1995 | Corcoran | 33/762 |
| 5,440,820 | 8/1995 | Hwang | 33/761 |
| 5,448,837 | 9/1995 | Han-Teng | 33/761 |
| 5,471,761 | 12/1995 | Cheng | 33/761 |
| 5,768,797 | 6/1998 | Trevino | 33/761 |
| 5,820,057 | 10/1998 | Decarolis et al. | 242/375.3 |
| 5,829,154 | 11/1998 | Lin | 33/767 |
| 5,875,987 | 3/1999 | Pullen | 242/379 |

* cited by examiner

*Primary Examiner*—G. Bradley Bennett

(57) ABSTRACT

Disclosed is a power-movement tape measure that has a tape wound on a spool rotatably mounted on a housing shaft. An electric motor having a worm gear affixed to its output slat is engaged in the external toothing of the spool. This motor is provided for driving the tape at a controlled speed both out of the housing and retracting the tape back into the housing. A switch energizes and selects the direction of the motor. The switch may be of constant speed or speed controlling type. The worm gear and spool toothing drive reduction mechanism also serves as resistance to unwanted tape movement, since a force applied to move the tape and spool imparts only a small vector of this force in a direction to spin the worm gear and motor. A rechargeable or a disposable battery may be contained in a housing battery receptacle for powering the motor. A flexible strap, that slides on part of the outer diameter of the tape, may be included to prevent the tape from uncoiling from the spool. The flexible strap may be resilient or fixed in length and kept in tension by a spring.

11 Claims, 4 Drawing Sheets

POWER-MOVEMENT MEASURING TAPE

BACKGROUND OF THE INVENTION

1. Field of the Invention

The present invention relates in general to hand-held devices and in particular to motorized tape measures.

2. Prior Art

Measuring tapes are well known in the art. An elongated flexible strip or tape of material having measuring indicia thereon is wound on a spool in a housing. Materials consist of cloth like materials, plastic or metal for the tape. Some measuring tapes with plastic or metal tape having measuring indicia thereon are wound on a spool that is associated with a spring. This spring is wound by pulling the tape from the spool in the housing and the wound spring retracts the tape upon release of the tape.

A drawback with this type of device is that it requires one hand of the operator to be used to hold the housing and the other hand of the operator to be used to pull the tape from the housing.

Another drawback with this type of device is that prevention of movement of the tape is typically done by manually engaging a lock mechanism.

A further drawback with this type of device is that the spring used to retract the tape into the spool pulls the tape at a very fast and uncontrolled speed allowing the end of the tape to strike the housing. These quick strikes against the housing can cause tape breakage.

A variety of power-movement tape measures have been disclosed in prior art that drive the tape out of the housing or into and out of the housing. Also, a variety of movement prevention or braking of the tape devices have been disclosed. These power-movement tape measures have complex reduction mechanisms in the drive systems. Furthermore, these power-movement tape measures have limited ability to resist tape movement when the motor is deactivated. A need exists to lower the complexity of the reduction and drive mechanism. This mechanism drives the tape on and off the spool, of a power-movement measuring tape. To accomplish this reduction in complexity, the need exists to reduce the number of components. This reduction in components is done by eliminating the need for drive belts, holes in the tape with engaging sprockets, tensioners with electronic feedback, clutches, drive rollers, recoiling springs or guide rollers opposed to the force of drive rollers.

Another need exists to provide resistance to tape movement for ease of use and to prevent the tape from uncoiling and getting jammed in the housing. This need is when the power-movement measuring tape is deactivated and activated. A further need exists for regulating the speed of the tape reduction into and against the housing to prevent tape breakage.

In order to provide background information so that the invention may be completely understood and appreciated in its proper context, reference may be made to a number of prior art patents as follows:

U.S. Pat. No. 5,875,897 to Pullen discloses a power-movement tape measure that only drives the tape off of the spool. This is done through a retention mechanism that consists of a motor output shaft driving gear, a step gear, a small gear and two pressure rollers one of which is driven by another gear. The retraction of the tape onto the spool is accomplished by a pull rod disengaging a pressure roller from the tape against a spring member. In this prior art, retraction of the tape is by a coiled spring and not controlled by the motor. Additionally, an embodiment also driving the tape off of the spool is disclosed by drive belt and three pulleys. A pull rod for disengaging the belt is also included.

U.S. Pat No. 5,768,797 to Trevino discloses a power-movement tape measure that drives the tape off and on the spool by a motor driving a friction roller through a complex planetary gear system. The prior art also states that the planetary gear system allows slippage between the reel and the drive motor. Additionally, a microprocessor is used for motor direction control.

U.S. Pat. No. 5,471,761 to Cheng discloses a power-movement tape measure that has the tape being slightly wider than the groove in the annular reel. This width is for keeping the tape from moving on the annular wheel. This prior art also discloses a gear train engaging the inner teeth of the annular reel for driving and the external teeth of the annular reel, which is used for braking. A brake pad is also toothed and movable into and out of contact with the annular reel by a switch coupled with a linkage.

U.S. Pat No. 5,48,837 to Han-Teng discloses a power-movement tape measure that has the tape being driven by a frictional pressing roller and guide roller. These rollers are meshed between a small gear and external toothing around an outside wall of an annular wheel holding the tape. This frictional pressing roller engages the tape for driving by a linkage attached to a gear train holding frame. No resistance is given in the retraction onto the spool. An additional gear train system is included to drive the spool by engagement to an inner wall of the spool.

U.S. Pat No. 5,440,820 to Hwang discloses a power-movement measuring tape that has a gear mounted on the output shaft of a motor engaged into a second gear slightly offset of center. This offset gear is mounted on a rod This offset second gear is then engaged to the inner toothed section of an annular reel. No provision is made for prevention of tape uncoiling. Additionally, protruding induction dots on the tape are included to trigger a block out device that feeds back to stop the motor.

U.S. Pat No. 5,386,643 to Corcoran discloses a power-movement measuring tape that has an equally spaced series of holes in the tape with a sprocket for driving the tape. Further disclosure states an option of a brake arm and brake pad engage to prevent rotation of the reel and disengagement to allow rotation of the reel.

U.S. Pat No. 5,044,089 to Petkovic discloses a power-movement measuring tape that is driven by a sprocket engaged in holes in the tape. Additionally, this prior art discloses one motor to extend the tape out and a second motor to retract the tape.

U.S. Pat No. 4,551,847 to Caldwell also discloses a power-movement measuring tape that is driven by a sprocket engaged in holes in the tape. Additionally, a gear train connects the motor to the sprocket and a belt is used to connect the reel to the gear train.

U.S. Pat No. 4,186,490 to Quenot discloses a power-movement measuring tape that is driven by a driving wheel engaging the tape, a speed reducer having a low speed shaft and a high speed shaft with an electric motor coupled with the high speed shaft of the reducer. A sifting pinion is also included coupled with the low speed shaft of the reducer. The pinion is shiftable between a first position in which it is coupled with the tape driving wheel and a second position in which it is coupled with the winding drum. Another disclosure of this prior art shows the driving wheel directly engaging the tape with a speed reducer having a low speed shaft and a high-speed shaft. This high-speed shaft of the reducer is again coupled with an electric motor. In addition, coupling of the low speed shaft of the speed reducer with both the driving wheel and the spool are also disclosed. A high-speed shaft and a low speed shaft are used in both cases. Furthermore this prior art discloses at least one flee roller and spring for preventing the tape from uncoiling. It can be readily seen that with only one fee roller and spring the tape can uncoil in areas not under the free roller and the embodiment shows four ball bearings with springs.

U.S. Pat. No. 5,294,066 to Lacour discloses a power cable spooling and unspooling device that shows a motor speed and rotation direction controlled by a tensioner giving feedback to the motor. Braking is applied by supplying power to the motor, which is connected, to a reel.

U.S. Pat No. 4,494,707 to Niibori discloses an apparatus for winding and unwinding an elongated flexible member, such as a window screen, by a frictional traction device. Furthermore, a clutch operatively the driving device from the winding rod during the unwinding operation.

U.S. Pat. No. 4,189,107 to Quenot discloses a coilable rule with automatic recoil with a motor and reduction mechanism within a hollow hub coaxially with the spool. Options are given for a two-stage reducer with a toothed belt, a two-stage planetary gear train and a two-stage epicyclic gear train A brake lever is locked so the tape can no longer be pulled outwards.

U.S. Pat. No. 5,245,761 to Walder discloses a manual-movement measuring tape with a braking device shiftably mounted on the housing movable into and out of engagement with the serrated edges of the spool.

As stated before, many manual-movement measuring tape braking devices are disclosed in prig art. U.S. Pat. No. 4,489,494 to Duda, as an example, discloses a typical slide actuator mounted on the housing engaging the tape as a braking device.

Whatever the precise merits, features and advantages of the above cited references, none of them achieves or fulfills the purposes of the present power movement measuring tape.

Accordingly, it is the principle object of the present invention to provide a lower complexity reduction mechanism that drives both extension and retraction of the tape.

It is another principle object of the present invention to prevent jamming of the tape in the housing from tape uncoiling when the motor is deactivated, retracting the tape and extending the tape.

It is a further principle object of the present invention to regulate the retraction of the tape speed.

SUMMARY OF THE INVENTION

In fulfillment and implementation of the previously recited objects, a primary feature of the invention resides in the provision of a unique reduction mechanism. This reduction mechanism is between the motor output shaft and the tape holding spool of a power movement measuring tape. Included in this redaction mechanism is a worm gear affixed to the motor output shaft and a tape holding spool. This spool has external serrations or toothing around one or more outside annular walls. This unique reduction mechanism allows for simple connectivity from a typical high-speed motor. Setting the desired speed of the spool and affixed tape is simply achieved through the pitch of the worm gear and spool teeth. In the present invention, one revolution of the motor advances the spool only the amount of the pitch. The motor is activated by a switch and the switch also provides for changing the direction of the motor. This motor drives the spool at a controlled speed to both extend the tape from the housing which holds the spool and retracting the tape back into the housing. The tape, with indicia thereon, has one end affixed to the spool and the other end extending through an opening to outside the housing. This outside end of the tape stops the tape by contacting the area adjacent to the housing opening upon full retraction of the tape. This contact is done under a controlled speed. When the motor is in the deactivated state, the unique worm drive reduction mechanism also serves as resistance to tape movement by the nature of the reduction mechanism. When a force is applied to move the tape, this force is transmitted to the spool and the external teeth, which in turn imparts a force on the worm gear that approaches perpendicular. This near perpendicular force has a small vector of the force applied by the spool external teeth being imparted in a direction to spin the worm gear and affixed motor.

Another unique feature of the present invention is a simple flexible strap to prevent the tape from uncoiling from the spool.

Other and further objects, advantages and features of the present invention will be understood by reference to the following specification in conjunction with the annexed drawings.

DESCRIPTION OF THE PREFERRED EMBODIMENT

Figure 1:
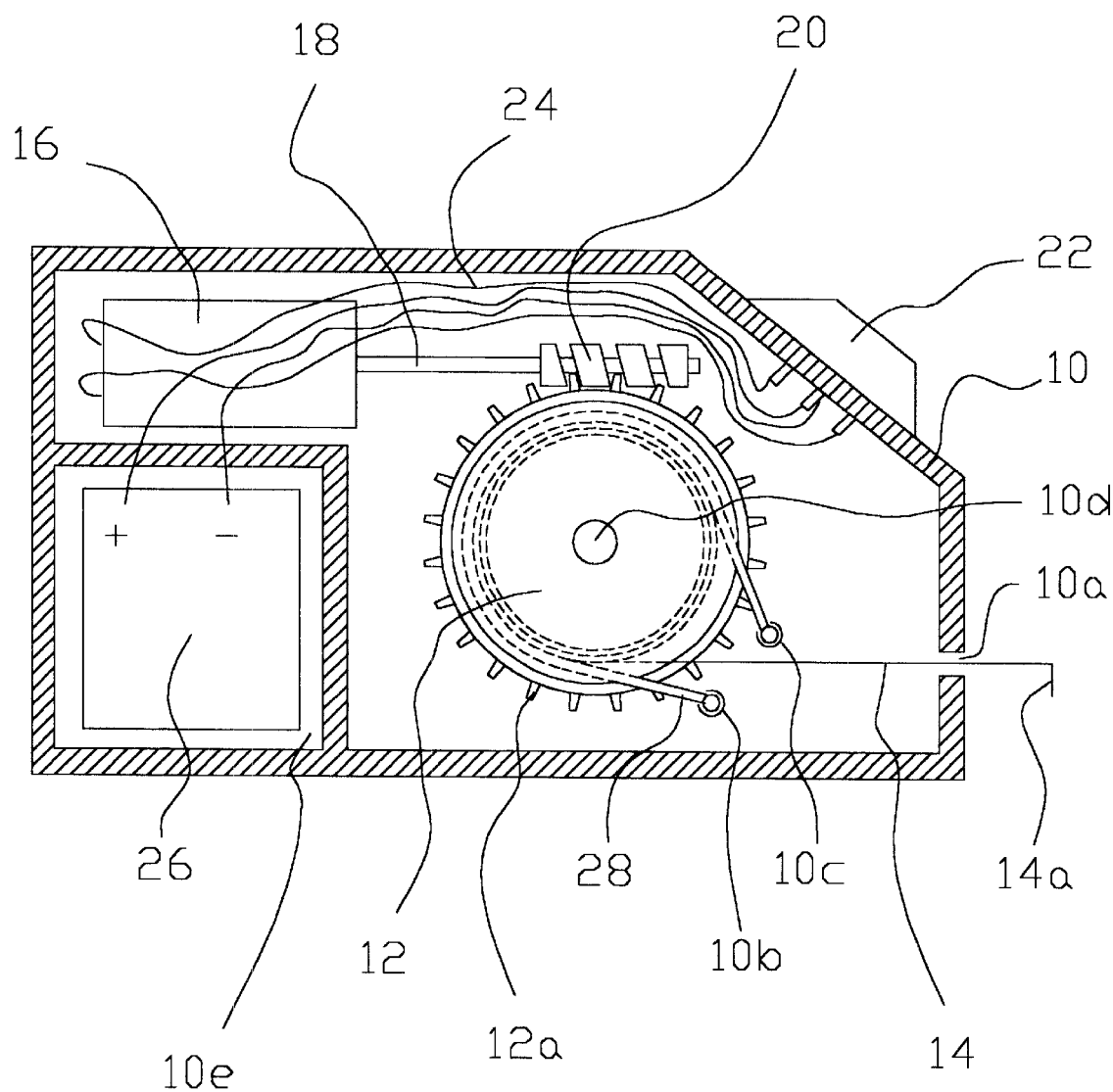
FIG. 1 is a cross-sectional side elevation view of the preferred embodiment of the present invention with a sidewall removed to show the arrangement of the various component elements therein.

FIG. 1 shows a cross-sectional side elevation view of the preferred embodiment of the present invention. The power-movement measuring tape with worm gear reduction and drive shown in FIG. 1 comprises a housing 10 with housing opening 10a and housing battery receptacle 10e. A flanged spool 12 containing annular spool external teeth 12a which is rotatably arranged on housing shaft 10d in housing 10. A tape 14 having measuring indicia thereon is affixed to spool 12 on one end and wound around spool 12. Tape 14 passes through housing opening 10a and a tape end 14a of tape 14 is of such physical dimension as not to be able to pass through the housing opening 10a. Tape end 14a remains outside of housing 10. A motor 16 is fixedly mounted in housing 10 and contains an output shaft 18. A reduction mechanism connecting output shaft 18 and spool 12 is of a worm gear 20 fixedly mounted to output shaft 18 and engaging the annular spool external teeth 12a. Motor 16 is activated by a switch 22 movable mounted on housing 10. An electrical connection of wiring 24 connects a rechargeable battery 26, in housing battery receptacle 10e, with motor 16 through switch 22. A flexible strap 28 is affixed to housing 10 via flexible strap connection point 10b and flexible strap connection point 10c. Flexible strap 28 partially encircles the tape 14, which is wound on spool 12 and provides sliding contact to tape 14.

Figure 2:
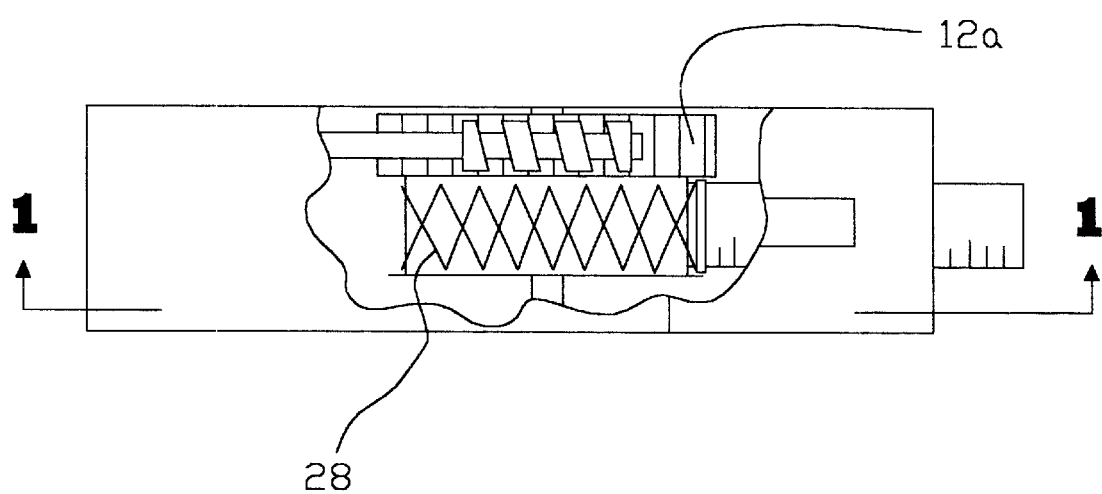
FIG. 2 is a partial sectional plan view of the preferred embodiment to show the output shaft worm gear, spool spool external teeth and flexible strap arrangement.

FIG. 2 shows a partial sectional plan view of the preferred embodiment to give a better understanding of the arrangement of the output shaft 18, worm gear 20, spool 12, spool external teeth 12a and flexible strap 28.

Figure 3:
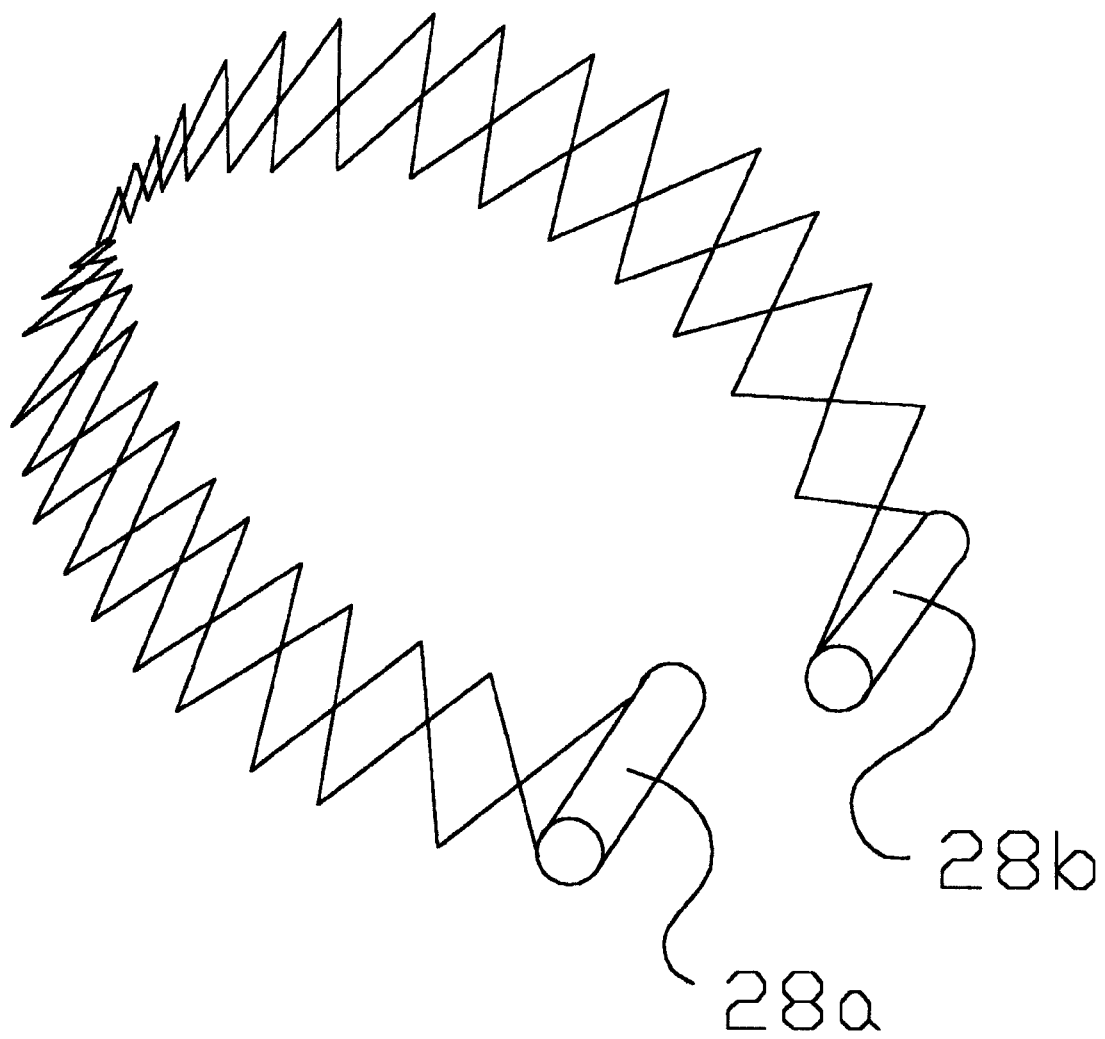
FIG. 3 is a perspective view of the preferred embodiment of the flexible strap.

FIG. 3 comprises flexible strap 28 of the preferred embodiment with a connector 28a and a connector 28b.

Connector 28a and connector 28b adjoin in FIG. 1 housing flexible strap connection point 10b and housing flexible strap connection point 10c.

Figure 4:
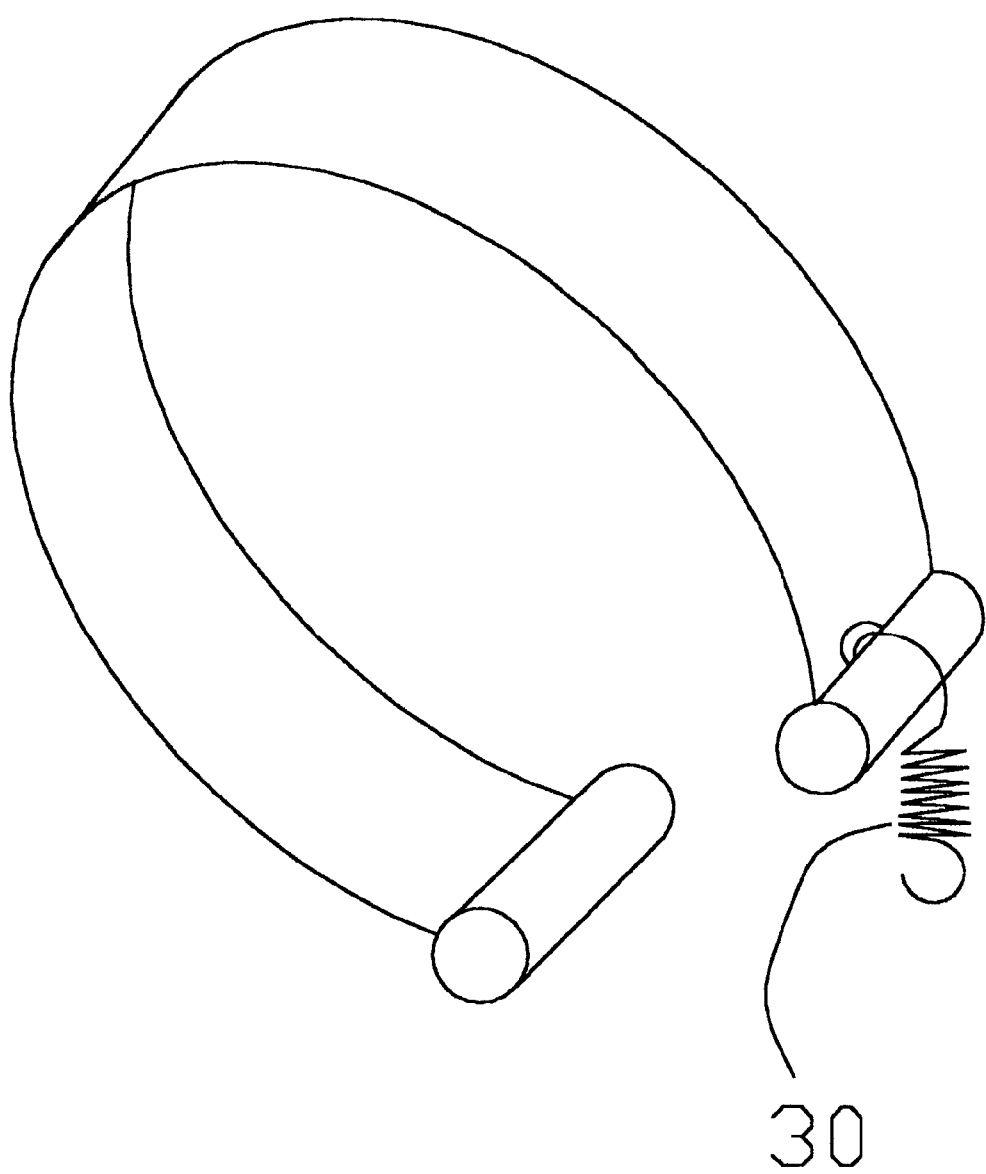
FIG. 4 is a perspective view of another embodiment of the flexible strap with a spring.

FIG. 4 is an additional embodiment of flexible strap 28 with a connector 28a, a connector 28b, and a flexible strap spring 30. One end of flexible strap ring 30 is attached to connector 28b. Connector 28a and the other end of flexible strap spring 30 adjoin in FIG. 1 housing flexible strap spring connection point 10b and housing flexible strap connection point 10c.

In operation, switch 22 pushed in a downward motion electrically connects motor 16 with battery 26 through wiring 24. This energizing connection spins motor 16 and output shaft 18 with affixed worm gear 20. Worm gear 20 rotating while being engaged with spool external teeth 12a rotates spool 12 around housing shaft 10d in a manner to drive tape 14 out of housing 10. Switch 22 when released returns to the center electrically off position. When switch 22 is pulled in an upward motion motor 16 is electrically connected with battery 26 through wiring 24 to spin motor 16 in the reverse direction as above, thus retracting tape 14 back into housing 10. This retraction is done in a manner such that tape end 14a stops on housing 10 near housing opening 10a. Again, when switch 22 is released it returns to the center electrically off position. Switch 22 is a double pole double throw return to center off position switch in the preferred embodiment.

In the preferred embodiment disclosed in FIG. 3, flexible strap 28 would be resilient and able to expand and contract in length as the outside diameter of the tape 14 expanded and contracted when tape 14 is wound or unwound from spool 12, thus preventing tape 14 uncoiling by contact and sliding contact.

The flexible strap 28 prevents tape 14 from uncoiling from spool 12. This prevention is accomplished while extending, retracting and in the off position. This flexible strap also is to be in sliding contact with tape 14.

The worm gear 20 being continuously engaged with spool external teeth 12a and the flexible strap 28 being continuously in contact with tape 14 prevents the tape from moving. This prevention is through the near perpendicular force of the spool external teeth 12a exerted on the worm gear 20.

In an additional embodiment shown in FIG. 4, flexible strap 28, of fixed predetermined length, would be pulled in tension by flexible strap spring 30 as the outside diameter of tape 14 expanded and contracted when the tape 14 is wound or unwound from spool 12.

In an additional embodiment, switch 22 is of the speed controlling type.

In an additional embodiment, battery 26 is of the disposable type.

Accordingly, the reader will see that the present novel power-movement measuring tape greatly reduces the complexity of the reduction and drive mechanism and regulates retraction speed to prevent damage.

Additionally, the novel invention prevents uncoiling problems.

Although the above description contains many specificities, these should not be construed as limiting the scope of the invention but merely proving illustrations of some of the presently preferred embodiments of the invention. Thus the scope of the invention should be determined by the appended claims and their legal equivalents, rather than by the examples given.

I claim:

1. A power-movement measuring tape comprising:
   a housing having a battery receptacle, housing shaft, and housing opening,
   a spool rotatably mounted on said housing shaft with at least one externally toothed section,
   a tape having measuring indicia thereon, said tape being wound around said spool with an end portion extending through said housing opening of said housing,
   a motor mounted in said housing and having an output shaft,
   a worm gear mounted on said output shaft and engaged in said externally toothed section of said spool,
   a switch mounted on said housing and electrically connected with said battery receptacle of said housing for energizing said motor to selectively rotate said spool and drive said tape in a direction out of said housing and in a reverse direction into said housing.

2. The power-movement measuring tape according to claim 1 wherein said switch is of the speed controlling type.

3. The power-movement measuring tape according to claim 1 wherein said battery receptacle contains a rechargeable battery.

4. The power-movement measuring tape according to claim 3 wherein the battery is of the disposable type.

5. A power-movement measuring tape comprising:
   a housing having a battery receptacle, housing shaft, housing opening, and means for connecting a flexible strap,
   a spool rotatably mounted on said housing shaft,
   a tape having measuring indicia thereon, said tape being wound on said spool with an end portion extending through said housing opening of said housing,
   a motor mounted in said housing and having an output shaft,
   a drive reduction mechanism connected to said output shaft and said spool,
   a switch mounted on said housing and electrically connected with said battery receptacle of said housing for energizing said motor to selectively rotate said spool and drive said tape in a direction out of said housing and in a reverse direction into said housing,
   a flexible strap at least partially encircling said tape on said spool and held by said means for connecting a flexible strap to said housing provided for preventing said tape uncoiling by means of contact and sliding contact to said tape.

6. The power-movement measuring tape according to claim 5 wherein the drive reduction mechanism is a worm gear mounted on said output shaft and said spool has at least one externally toothed section for engaging said worm gear.

7. The power-movement measuring tape according to claim 5 wherein said switch is of the speed controlling type.

8. The power-movement measuring tape according to claim 5 wherein said battery receptacle contains a rechargeable battery.

9. The power-movement measuring tape according to claim 8 wherein the battery is of the disposable type.

10. The power-movement measuring tape according to claim 5 wherein said flexible strap is of resilient material.

11. The power-movement measuring tape according to claim 5 wherein said flexible strap is of fixed predetermined length and is able to expand and contract with said tape by at least one spring connecting said flexible strap to said means for connecting flexible strap of said housing.

* * * * *